United States Patent [19]

Kokoszka

[11] 3,836,371

[45] Sept. 17, 1974

[54] POLISH INGREDIENT

[75] Inventor: John G. Kokoszka, Midland, Mich.

[73] Assignee: Dow Corning Corporation, Midland, Mich.

[22] Filed: Feb. 7, 1973

[21] Appl. No.: 330,375

[52] U.S. Cl............................ 106/10, 106/4, 106/5, 106/11
[51] Int. Cl.......................... C08h 9/06, C09a 1/08
[58] Field of Search ................................. 106/3–11

[56] References Cited
UNITED STATES PATENTS 3,508,933  4/1970  Yates................................... 106/10
3,705,120  12/1972 Kawaguchi......................... 117/135.1

*Primary Examiner*—Theodore Morris
*Attorney, Agent, or Firm*—Jack E. Moermond

[57] ABSTRACT

There is claimed a mixture consisting essentially of (1) 45 to 99.5 percent by weight of a hydroxyl end-blocked polydimethylsiloxane having a viscosity in the range of 10 to 15,000 cs. at 25°C., (2) 0.3 to 35 percent by weight of a silane having the formula $(RO)_3SiR'NHR''$ or $(RO)_3SiR'NHCH_2CH_2NH_2$ wherein R is an alkyl radical containing from one to four carbon atoms, R' is a divalent hydrocarbon radical free of aliphatic unsaturation and contains from three to four carbon atoms, and R'' is a hydrogen atom or a methyl radical, and (3) 0.2 to 25 percent by weight of a silane having the general formula $X_3SiZ$ wherein X is an alkoxy or acyloxy radical containing from one to four carbon atoms and Z is a nonhydrolyzable hydrocarbon or halohydrocarbon radical or a nonhydrolyzable radical composed of carbon, hydrogen and oxygen atoms wherein the oxygen atoms are present in hydroxyl groups, ester groups or ether linkages, there being from one to 10 carbon atoms in the Z radical. This composition is incorporated in polishes, particularly wax containing polishes such as furniture and floor polishes, whereby detergent resistance and easy rubout are obtained.

8 Claims, No Drawings

POLISH INGREDIENT

Research in the field of polishes is somewhat akin to the alchemists' search for the miraculous philosophers' stone. That is to say, researchers in the field of polishes are constantly looking for ingredients and polish formulations which will result in the finished product having all those properties desired and none of the detrimental properties often encountered. And who is to say they will not succeed. For although the alchemists did not find the philosophers' stone, their dreams have been realized to a large extent with the coming of the Atomic Age which made the transmutation of elements a reality. While the present invention is not the ultimate solution to all the problems in the field of polishes, it is believed to be a signficant step forward toward that end.

The one essential function of all polishes, particularly wax containing polishes, is protection of the article to which they are applied. Ancillary, but nonetheless important, properties and functions which the polishes should possess include, among others, appearance (gloss) of article; durability to water, solvent (alcohol) and detergents; little or no build up with repeated applications; and easy application (i.e., easy to wipe out or rub out).

It is an object of this invention to provide a composition which when incorporated into a polish will result in substantial improvements in those characteristics mentioned above. More specifically, it is an object of this invention to provide a composition which when incorporated into a polish will improve the polish's durability (particularly detergent resistance), resistance to build up, and ease of application, without sacrificing protection and appearance. Other objects and advantages of the present invention will be apparent from the following description, examples and claims.

This invention relates to a composition which consists essentially of (1) 45 to 99.5 percent by weight of a hydroxyl endblocked polydimethylsiloxane having a viscosity in the range of 10 to 15,000 cs. at 25°C., (2) 0.3 to 35 percent by weight of a silane selected from the group consisting of those having the general formulae $(RO)_3SiR'NHR''$ and $(RO)_3SiR'NHCH_2CH_2NH_2$ wherein R is an alkyl radical containing from one to four carbon atoms, R' is a divalent hydrocarbon radical free of aliphatic unsaturation and contains from three to four carbon atoms, and R'' is selected from the group consisting of the hydrogen atom and the methyl radical, and (3) 0.2 to 25 percent by weight of a silane having the general formula $X_3SiZ$ wherein X is selected from the group consisting of alkoxy and acyloxy radicals containing from one to four carbon atoms and Z is a nonhydrolyzable radical selected from the group consisting of hydrocarbon radicals, halogenated hydrocarbon radicals and radicals composed of carbon, hydrogen and oxygen atoms wherein the oxygen atoms are present in hydroxyl groups, ester groups or ether linkages, there being from one to 10 carbon atoms in the Z radical.

This invention further relates to an improvement in polishes, particularly those containing a wax, which comprises incorporating into the polishes a mixture as defined above.

In the above formulae R can be an alkyl radical containing from one to four carbon atoms. Thus R can be, for example, a methyl, ethyl, propyl, isopropyl, butyl or tertiary-butyl radical. Preferably R is a methyl, ethyl or isopropyl radical.

R' in the above formulae can be any divalent hydrocarbon radical free of aliphatic unsaturation which contains three or four carbon atoms. Thus R' can be, for example, a $-(CH_2)_3-$, $-(CH_2)_4-$ or a $-CH_2CH(CH_3)CH_2-$ radical. The function of the R' radical is to link the silicon and nitrogen atoms, and there must be at least three carbon atoms between the silicon and nitrogen atoms.

In the silane (3), X can be any alkoxy or acyloxy radical containing from one to four carbon atoms. Thus X can be, for example, a methoxy, ethoxy, isopropoxy, butoxy, formyloxy, acetoxy or a propionoxy radical. Preferably X is a methoxy or an acetoxy radical.

The Z radical of silane (3) can be any nonhydrolyzable hydrocarbon or halohydrocarbon radical or a nonhydrolyzable radical composed of carbon, hydrogen and oxygen atoms wherein the oxygen atoms are present as hydroxyl, ester or ether groups or linkages. There can be from one to 10 carbon atoms in Z. Specific examples of Z include the methyl, ethyl, propyl, isopropyl, butyl, amyl, hexyl, 2-ethylhexyl, decyl, vinyl, allyl, decenyl, cyclohexyl, phenyl, benzyl and tolyl radicals; the corresponding halogenated radicals such as the chloropropyl, trifluoropropyl, and dichlorophenyl radicals; and the hydroxybutyl, hydroxyphenyl, $-(CH_2)_3OOCC(CH_3)=CH_2$,

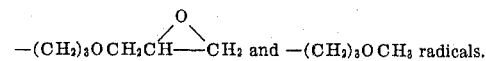

It does not appear at this time that there is any criticality in the method of preparing the composition of this invention. The simplest and preferred method is to cold blend the three ingredients using such proportions as will give a composition in which the amounts of 1:2:3 will be in the percentage ranges set forth above.

The amount of the composition of this invention which is incorporated into a wax-containing polish will depend on the particular formulation, the intended use of the formulation, and the properties being sought by the formulator. Generally speaking, however, an amount in the range of 0.25 to 5 percent by weight based on the total weight of the formulation will satisfy most situations.

The composition of this invention can be used to impart detergent resistance ease of rub-out, and other improved properties to any of the standard types of polishes; namely, solvent-based polishes, water-based (emulsion) polishes, or paste wax polishes. The composition of this invention is particularly useful in preparing automobile polishes but also is useful in preparing furniture, metal and other kinds of polishes.

The various waxes, solvents, surfactants, thickening agents, abrasives, dyes, odorants, and other ingredients normally used in making polishes are well known to those skilled in the art and are described in numerous places in the literature. Specific illustrative examples of suitable ingredients will be set forth in the examples. Now in order that those skilled in the art may better understand how the present invention can be practiced, the following examples are given by way of illustration and not by way of limitation. All parts and percents referred to herein are on a weight basis, and all viscosities measured at 25°C., unless otherwise specified.

Example 1

A composition was prepared by cold blending a mixture of 75 percent of a hydroxyl endblocked polydimethylsiloxane having a viscosity of about 40 cs., 15 percent of $(CH_3O)_3Si(CH_2)_3NHCH_2CH_2NH_2$ and 10 percent of $(CH_3O)_3SiCH_3$.

An automobile cleaner/polish was prepared which consisted essentially of 2 percent of the composition of this invention set forth above, 2 percent of a trimethylsilyl-endblocked polydimethylsiloxane having a viscosity of about 12,500 cs., 1 percent of a polyhydric alcohol fatty acid ester surfactant containing unesterified hydroxy groups (Emcol 14), 25 percent of Stoddard solvent, 10 percent of kaolin clay abrasive (Kaopolite SF-0) and 60 percent water. This composition was prepared by first mixing all the ingredients except water together and then slowly adding the water to the resulting mixture while continuously mixing well. This polish is a water-in-oil emulsion. This polish was easy to rub-out and had excellent gloss and detergent resistant properties when used on automobiles.

It is noted at this point that when the compositions of this invention are incorporated into polishes that water repellency develops almost immediately after the polish is applied whereas 3 to 4 hours are needed for detergent resistance to develop. Optimum detergent resistance appears to develop after about 24 hours.

Example 2

An automobile cleaner/polish was prepared which consisted essentially of (a) 1 percent of a composition consisting of 75 percent of a hydroxyl endblocked polydimethylsiloxane having a viscosity of about 40 cs., 15 percent of $(CH_3O)_3Si(CH_2)_3NHCH_2CH_2NH_2$ and 10 percent of $(CH_3O)_3SiCH_3$, (b) 6 percent of a composition consisting of 90 percent of a hydroxyl endblocked polydimethylsiloxane having a viscosity of about 400 cs. and 10 percent of $(CH_3O)_3Si(CH_2)_3NHCH_2CH_2NH_2$, (c) 1 percent of a polyhydric alcohol fatty acid ester surfactant containing unesterified hydroxy groups (Emcol 14), (d) 22 percent of Stoddard solvent, (e) 10 percent of kaolin clay abrasive (Kaopolite SF-0), and (f) 60 percent of water. This composition was prepared following the procedure of Example 1 to obtain an oil-in-water emulsion. This polish also was easy to rub-out and had excellent gloss and detergent resistance.

Example 3

An auto polish was prepared which consisted essentially of (1) 0.6 percent of phenyl stearic acid, (2) 6.0 percent of a composition consisting of 90 percent of a hydroxyl endblocked polydimethylsiloxane having a viscosity of about 400 cs. and 10 percent of $(CH_3O)_3Si(CH_2)_3NHCH_2CH_2NH_2$, (3) 2.0 percent of a composition consisting of 75 percent of a hydroxyl endblocked polydimethylsiloxane having a viscosity of about 40 cs., 15 percent of $(CH_3O)_3Si(CH_2)_3NHCH_2CH_2NH_2$ and 10 percent of $(CH_3O)_3SiCH_3$, (4) 10.0 percent of kerosene, (5) 16.4 percent of Stoddard solvent, (6) 10.0 percent of kaolin clay abrasive (Kaopolite SF-0), (7) 1.0 percent of a polyhydric alcohol fatty acid ester surfactant containing unesterified hydroxy groups (Emcol 14), and (8) 54.0 percent of water.

The above composition was prepared by first mixing ingredients (1), (2) and (3) for 5 minutes. Then ingredients (4), (5), (6) and (7) were added with mixing to insure uniformity. Finally, the water was added slowly with good agitation. The resulting water-in-oil emulsion polish had excellent detergent resistance and a high degree of corrosion resistance.

The following table illustrates the corrosion resistance of the above prepared polish to presently available commercial polishes.

| Test Method | Elapsed Time for First Corrosion To Appear on Metal Surfaces | |
|---|---|---|
| | Commercial Polishes* | Polish of This Example |
| A. Polished steel panels immersed in 120°F. distilled water | 15–20 minutes | 210 minutes |
| B. Polished steel panels sprayed with 5% NaCl solution at 100°F. and 100% humidity (ASTM B-117-61) | 10–20 minutes | 120 minutes |
| C. 5% NaCl solution puddled on polished steel panels | 10–15 minutes | 90 minutes |
| D. Polished steel panel placed in Q-panel tester at 104°F. and constant humidity chamber | 1–3 hours | 12+ hours |

*Master-Wax, Liquid GT Wax, Vista, Turtle Wax Hardshell, Turtle Wax Super Hardshell, Weather Wax, Jet-Wax and NuCar Wax.

Example 4

A detergent resistant water-based paste auto polish/cleaner was prepared which consisted essentially of (1) 1.5 percent of a polyhydric alcohol fatty acid ester surfactant containing unesterified hydroxy groups (Emcol 14), (2) 4.0 percent of a trimethylsilyl-endblocked polydimethylsiloxane having a viscosity of about 1000 cs., (3) 10.0 percent of carnauba wax No. 3, (4) 0.4 percent of morpholine, (5) 25.0 percent of deodorized kerosene (Isopar L), (6) 2.0 percent of a composition consisting of 75 percent of a hydroxyl endblocked polydimethylsiloxane having a viscosity of about 40 cs., 15 percent of $(CH_3O)_3Si(CH_2)_3NHCH_2CH_2NH_2$ and 10 percent $(CH_3O)_3SiCH_3$, (7) 10.0 percent of kaolin clay abrasive (Kaopolite SF-0), and (8) 47.1 percent of water.

This product was prepared by placing ingredients (1), (2), and (3) and one-half of ingredient (5) in a vessel and heating to melt the wax at approximately 90°C. with agitation. (Caution should be used in this step as the mixture is flammable.) Next the morpholine is added with agitation. Then ingredient (6) and the remaining ingredient (5) is added, followed by the addition of ingredient (7), all with agitation, and keeping the temperature at 80°C. When the mixture is uniform, the water is added slowly with agitation and maintaining the temperature at 80°C. After all the water is added the heat is removed but mixing is continued until the temperature drops to 55°C. at which point the composition may be poured into containers.

This creamy paste polish in addition to being detergent resistant has outstanding rub-out compared to currently available products on the market, and excellent depth of gloss.

Example 5

An auto rinse polish was prepared which consisted essentially of (1) 44 percent of a composition which consisted of 75 percent of a hydroxyl endblocked polydimethylsiloxane having a viscosity of about 40 cs., 15 percent of $(CH_3O)_3Si(CH_2)_3NHCH_2CH_2NH_2$ and 10 percent of $(CH_3O)_3SiCH_3$, (2) 50 percent isopropyl alcohol (99 percent pure), and (3) 6 percent of glacial acetic acid. This concentrate was prepared by mixing ingredients (2) and (3) and then adding them to ingredient (1).

For use, one part of the above concentrate is mixed with 20 parts of water for excellent water beading and gloss on a clean car finish. One ounce of concentrate is enough for most automobiles.

The diluted concentrate can be applied by use of a sponge or cloth and rinsed with water without drying. The diluted concentrate can also be applied and wiped to dryness with a cloth. Added wiping gives improved polish performance.

Example 6

When the following compositions are substituted for ingredient (1) of Example 5 or the corresponding ingredient in the other examples, similar results are obtained.

(A)
45% $HO[(CH_3)_2SiO]_xH$ viscosity 100 cs.
35% $(C_2H_5O)_3SiCH_2CH(CH_3)CH_2NHCH_2CH_2NH_2$
20% $(CH_3COO)_3SiCH_3$ (B)
90% $HO[(CH_3)_2SiO]_xH$ viscosity 80 cs.
5% $(C_3H_7O)_3Si(CH_2)_3NHCH_2CH_2NH_2$
5% $(C_3H_7O)_3SiCH_3$ (C)
75% $HO[(CH_3)_2SiO]_xH$ viscosity 50 cs.
10% $(C_4H_9O)_3Si(CH_2)_3NH_2$
15% $(C_4H_9O)_3SiC_4H_9$ (D)
80% $HO[(CH_3)_2SiO]_xH$ viscosity 10 cs.
10% $(C_2H_5O)_3Si(CH_2)_3NH(CH_3)$
10% $(C_2H_5O)_3SiC_2H_5$ (E)
65% $HO[(CH_3)_2SiO]_xH$ viscosity 15,000 cs.
15% $(CH_3O)_3Si(CH_2)_3NHCH_2CH_2NH_2$
20% $(CH_3O)_3Si(CH_2)_3Cl$ (F)
75% $HO[(CH_3)_2SiO]_xH$ viscosity 100 cs.
15% $(CH_3O)Si(CH_2)_3NHCH_2CH_2NH_2$
10% $(CH_3O)_3Si(CH_2)OOCC(CH_3)=CH_2$ (G)
75% $HO[(CH_3)_2SiO]_xH$ viscosity 100 cs.
15% $(C_2H_5O)_3Si(CH_2)_3NH_2$ 10% $(CH_3O)_3Si(CH_2)_3OCH_2CH\underset{O}{\overset{}{-\!\!\!-\!\!\!-}}CH_2$ (H)
75% $HO[(CH_3)_2SiO]_xH$ viscosity 100 cs.
15% $(CH_3O)_3Si(CH_2)_3NHCH_2CH_2NH_2$
10% $(C_2H_5O)_3SiC_6H_5$ (I)
75% $HO[(CH_3)_2SiO]_xH$ viscosity 100 cs.
15% $(CH_3O)_3Si(CH_2)_3NHCH_2CH_2NH_2$
10% $(C_2H_5O)_3SiCH=CH_2$

Example 7

An excellent water based detergent resistant auto polish was prepared which consisted essentially of (1) 50 percent of a hydroxyl endblocked polydimethylsiloxane having a viscosity of about 4000 cs., (2) 4 percent of a trimethyl nonyl polyethylene glycol ether nonionic surfactant (90 percent solution)(Tergitol TMN-6), (3) 0.7 percent of an N-alkyl trimethyl ammonium chloride cationic surfactant (50 percent solution)(Arquad T-50), (4) 0.1 percent of sodium nitrite, (5) 0.7 percent of $(CH_3O)_3Si(CH_2)_3NHCH_2CH_2NH_2$, (6) 0.35 percent of $(CH_3O)_3SiCH_3$, and (7) 44.15 percent water.

Example 8

An excellent water based detergent resistant auto polish was prepared which consisted essentially of (1) 50 percent of a hydroxyl endblocked polydimethylsiloxane having a viscosity of about 4000 cs., (2) 4 percent of a trimethyl nonyl polyethylene glycol ether nonionic surfactant (90 percent solution)(Tergitol TMN-6), (3) 0.7 percent of an N-alkyl trimethyl ammonium chloride cationic surfactant (50 percent solution)(Arquad T-50), (4) 0.1 percent of sodium nitrite, (5) 0.3 percent of $(CH_3O)_3Si(CH_2)_3NHCH_2CH_2NH_2$, (6) 0.15 percent of $(CH_3O)_3SiCH_3$, and (7) 44.75 percent water.

That which is claimed is:

1. In a polish formulation containing as components thereof at least one member selected from the group consisting of waxes, solvents, surfactants, thickening agents, abrasives, dyes, odorants, and other ingredients normally used in making polishes, the improvement comprising incorporating therein a composition which consists essentially of (1) 45 to 99.5 percent by weight of a hydroxyl endblocked polydimethylsiloxane having a viscosity in the range of 10 to 15,000 cs. at 25°C., (2) 0.3 to 35 percent by weight of a silane selected from the group consisting of those having the general formulae $(RO)_3-SiR'NHR''$ and $(RO)_3SiR'NHCH_2CH_2NH_2$ wherein R is an alkyl radical containing from one to four carbon atoms, R' is a divalent hydrocarbon radical free of aliphatic unsaturation and contains from three to four carbon atoms, and R'' is selected from the group consisting of the hydrogen atom and the methyl radical, and (3) 0.2 to 25 percent by weight of a silane having the general formula $X_3SiZ$ wherein X is selected from the group consisting of alkoxy and acyloxy radicals containing from one to four carbon atoms and Z is a nonhydrolyzable radical selected from the group consisting of hydrocarbon radicals, halogenated hydrocarbon radicals and radicals composed of carbon, hydrogen and oxygen atoms wherein the oxygen atoms are present in hydroxyl groups, ester groups or ether linkages, there being from one to 10 carbon atoms in the Z radical.

2. A polish as defined in claim 1 which is solvent based.

3. A polish as defined in claim 1 which is water based.

4. A polish as defined in claim 1 which contains a wax.

5. A polish as defined in claim 4 which is in the form of a paste wax.

6. A polish formulation as defined in claim 1 wherein in the composition (1) is 65 to 85 percent and the viscosity is in the range of 10 to 1000 cs., (2) is 10 to 20 percent and has the formula $(RO)_3SiR'NHCH_2CH_2NH_2$, and (3) is 5 to 15 percent, X is an alkoxy radical and Z is an alkyl radical.

7. A polish formulation as defined in claim 6 wherein (1) is about 75 percent, (2) is about 15 percent and has the formula $(CH_3O)_3Si(CH_2)_3NHCH_2CH_2NH_2$, and (3) is about 10 percent and has the formula $(CH_3O)_3SiCH_3$.

8. A polish composition as defined in claim 1 wherein in the composition (1) is 65 to 85 percent and the viscosity is in the range of 10 to 1000 cs., (2) is 10 to 20 percent and has the formula $(RO)_3SiR'NHR''$, and (3) is 5 to 15 percent, X is an alkoxy radical and Z is an alkyl radical.

* * * * *